United States Patent [19]

Takahashi

[11] 4,247,875
[45] Jan. 27, 1981

[54] CIRCUITRY FOR ADJUSTMENT OF BIASING CURRENT FOR RECORDING SOUND BY TWO-HEAD TYPE TAPE-RECORDER

[75] Inventor: Satoshi Takahashi, Toyonaka, Japan

[73] Assignee: Onkyo Kabushiki Kaisha, Osaka, Japan

[21] Appl. No.: 29,511

[22] Filed: Apr. 12, 1979

[30] Foreign Application Priority Data

Apr. 28, 1978 [JP] Japan .............................. 53-58207[U]

[51] Int. Cl.³ .......................... G11B 5/47; G11B 5/02
[52] U.S. Cl. ........................................ 360/66; 360/25
[58] Field of Search ...................... 360/66, 65, 67, 68, 360/27, 31, 25

[56] References Cited

U.S. PATENT DOCUMENTS

| | | | |
|---|---|---|---|
| 2,791,640 | 5/1957 | Wolfe | 360/31 |
| 3,564,160 | 2/1971 | Temes | 360/31 |
| 3,798,673 | 3/1974 | Koinumo | 360/66 |
| 4,011,585 | 3/1977 | Sunaga | 360/66 |
| 4,038,692 | 7/1977 | Umeda et al. | 360/66 |

*Primary Examiner*—Vincent P. Canney
*Attorney, Agent, or Firm*—Edwin E. Greigg

[57] ABSTRACT

A circuitry has a calibration signal generator, a higher frequency range output level adjusting circuit and a recording bias current adjusting variable resistor. The signal generator continually alternately gives output two kinds of calibration signals of lower and higher frequencies. The higher range adjusting circuit is operatively connected with the variable resistor, and adjusts output sound level, as indicated at an indicator, only of the higher frequency signal of the two calibration signals.

7 Claims, 8 Drawing Figures

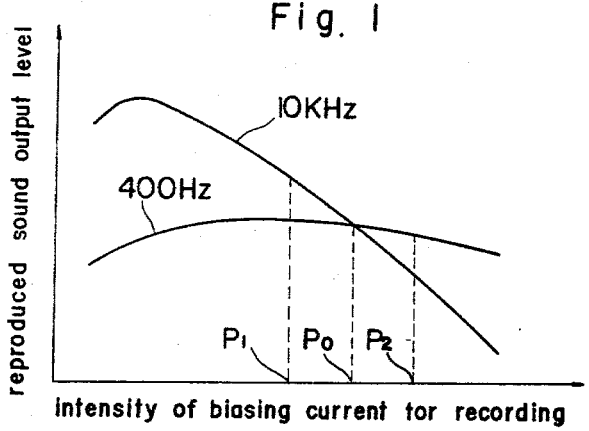
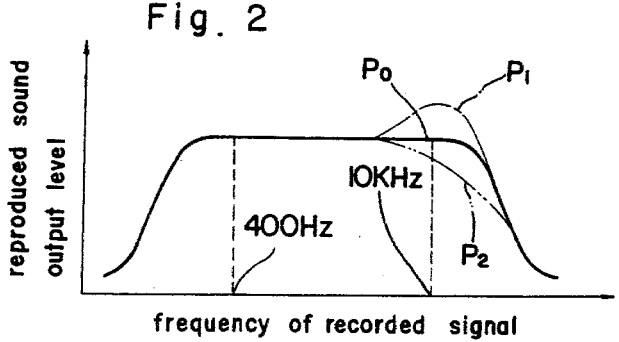
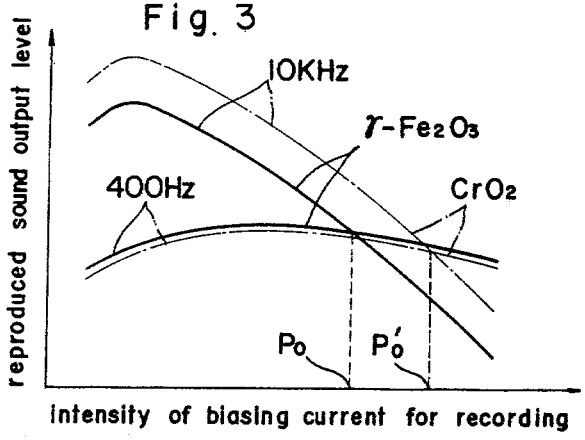

CIRCUITRY FOR ADJUSTMENT OF BIASING CURRENT FOR RECORDING SOUND BY TWO-HEAD TYPE TAPE-RECORDER

BACKGROUND OF THE INVENTION

This invention relates to improvement of a circuitry for adjustment of biasing current for recording, as is incorporated in a two-head type tape-recorder, thus having an eraser head and another head usable dually for recording and reproducing the sound.

In this field of art, it is a conventionally established knowledge that the reproduced sound output level shows variation in accordance with variation in the intensity of the biasing current for the recording, and that correlation between these two variations differs as a function of the frequency of the recorded sound, as diagramatically shown in FIG. 1 of the accompanying drawings, which is a chart with the magnetic tape recording bias current intensity on abscissa and the reproduced sound output level on ordinate, giveing two typical curves with respect to the sounds of 400 Hz and 10 kHz, respectively.

As is apparent, ratio of the reproduced sound output level variation to the recording bias current intensity variation is smaller in the case of comparatively low frequency sound than in the case of comparatively high frequency sound.

Thus, remarkable effect of variation in the intensity of the recording bias current over the frequency characteristic chart of the reproduced sound with a given tape-recording apparatus is seen in the higher frequency range, as illustrated in FIG. 2.

In order to realize optimal frequency characteristics with the widest flat range, it is essential to properly select the recording bias current intensity as will result in the same reproduced sound output level in the lower frequency signal range (as may be represented for instance by 400 Hz) as in the higher frequency signal range (as may be represented for instance by 10 kHz). Such optimal biasing current intensity is designated in FIGS. 1 and 2 at $P_o$.

Said chart of correlation between the recording bias current intensity and the reproduced sound level also differs or deflects considerably as the magnetic characteristics of the recording tape material differ, and it is also in the higher frequency range that such deflection of the characteristics is prominent.

For instance, FIG. 3 illustrates the comparison of the characteristic curves, similar to those shown in FIG. 1, thus for 400 Hz and 10 kHz, with respect to the tape using $CrO_2$ as the magnetic material (shown in solid lines) and the tape generally referred to as "normal", using $\gamma\text{-}Fe_2O_3$ (in broken lines), and it is thus apparent that the said optimal biasing current intensity $P_o'$ in the case of $CrO_2$, to give the same reproduced sound output level both for 400 Hz and 10 kHz, is larger than the intensity $P_o$ of the same optimal nature in the case of $\gamma\text{-}Fe_2O_3$. In other words, the former material $CrO_2$ requires stronger recording bias current for realizing the ideal sound reproduction frequency characteristics, with the widest flat range, than does the latter material $\gamma\text{-}Fe_2O_3$.

It is essential, therefore, to select the optimal recording bias current intensity in proper accordance with the magnetic characteristics of the particular tape material actually in use, for realizing the said ideal sound reproduction frequency characteristics with the widest flat range, and in view that one must foresee to use various kinds of tapes, of the materials with magnetic characteristics different from one to another (for instance $CrO_2$, FeCr, $\gamma\text{-}Fe_2O_3$ and so forth), in tape-recorders, especially those of casette-type, there have by now been in use those wherein the recording bias current is adjustable or variable in accordance with the kind of the magnetic tape actually used.

For instance, there have been tape-recorders with such circuitry for adjusting the recording bias current as may switch over the current intensity in a few pre-set steps or as may effect further precise readjustment by means of continuously manipulating a variable resistor after first selectively switching over the current also in a few steps, in accordance with the kind of the magnetic tape actually used.

As is apparent, it is not possible with the simple former circuitry providing only the shifting-over in a few steps, to always set the truly optimal recording bias current intensity for all the magnetic tapes with the magnetic characteristics different from one to another in a quite wide range. On the other hand, the latter circuitry, providing the continuous precise readjustment after shifting over the recording bias current in a few steps, can principally always set the truly optimal current for any foreseeable kind of magetic tapes, but there still is a difficulty or defect with respect to the mode of manipulation as is required for adjusting the recording bias current, even in this latter type of the circuitry, if the tape-recorder is of the so-called two-head type construction, thus having an eraser head and another head to be used dually for recording and reproducing. Looking into further detail in this respect, it is rather easy in the case of the so-called three-head type tape-recorder, thus having independently workable separate recording and reproducing heads as well as an eraser head, to properly perform the adjustment of the recording bias current, since it is possible in such case to immediately check, by simultaneously reproducing the sound while recording same, the resulting effect of adjusting the recording bias current, but the adjustment procedure is quite troublesome in the case of two-head type tape-recorders, since simultaneous recording and reproducing is impossible in such case and thus repeated alternate procedures of recording and reproducing the sound are here required before reaching the proper adjustment of the recording bias current.

In order to more clearly describe the procedures, reference is made to FIG. 4 which is a block diagram of the essential portion of such two-head type tape-recorder with conventional circuitry for adjustment of the recording bias current.

Designated at 40 is the sound signal line input terminal, 41 is the head to be used dually for recording and reproducing the sound, 42 is a reproducing equalizer amplifier, 43 is a main line amplifier, 44 is a meter amplifier, 45 and 46 are calibration signal generators to give the calibration signals of a lower frequency (for instance 400 Hz) and a higher frequency (for instance 10 kHz), respectively, 47 is a recording amplifier, 48 is a biasing oscillator, 49 is a recording bias current selection switch (with contacts a, b and c destined for instance to $CrO_2$, FeCr and $\gamma\text{-}Fe_2O_3$, respectively), 50 is a variable resistor for adjusting intensity of the recording bias current, 51 is a calibration signal selection switch (with contacts l and h destined to the lower and higher frequency signals, respectively), 52 is a meter to indicate the reproduced sound output level, 53 is a recording and reproduction mode selection switch (with contacts r and p destined to recording and reproducing the sound, respectively) and 54 is the sound signal line output terminal. The symbol +B' represents the power source voltage for the biasing oscilater 48.

As the first step to perform proper adjustment of the recording bias current with the circuitry constructed as above, the recording bias current selection switch 49 is set to a suitable contact position corresponding to the magnetic material of the tape actually used, and the lower frequency calibration signal is recorded. After the recording, this tape-recorder is used in reproduction mode to read and memorize the indication, at the output level meter 52, of the sound reproduced from the said recorded tape. Then, similar recording and reproducing procedures are performed this time with respect to the higher frequency calibration signal. There will normally be seen some difference in the indications of the meter 52 of the lower and higher frequency signals, and in the intention of compensating the unbalance, the recording bias current adjusting variable resistor 50 is manipulated on a trial basis. Upon such trial manipulation, the entire process of recording and reproducing both of the lower and higher frequency calibration signals is repeated, in order to check, by reading the indications of the meter 52, whether the trial manipulation was appropriate or not.

It is thus normally required to cyclically repeat again and again the procedures of: recording the lower frequency calibration signal; reproducing the recorded signal; reading the level indication of the reproduced signal; recording the higher frequency calibration signal; reproducing the recorded signal; checking the level indication balance; and readjusting the variable resistror 50. As is now apparent, the procedures for ultimately obtaining the optimal recording bias current adjustment have the drawbacks of being quite troublesome and of requiring highly skilled operator, and are therefore not very practical.

SUMMARY OF THE INVENTION

This invention is made to eliminate the drawbacks of the conventional circuitry for adjustment of the recording bias current in a two-head type tape-recorder as mentioned hereinabove, and has therefore as its object to provide an improved circuitry which enables to actually obtain the optimal recording bias current adjustment by a very simple, easy and rapid process.

In order to attain the object, the circuitry for adjustment of biasing current for recording as is incorporated in a two-head type tape-recorder is characterized in that it comprises: a calibration signal generator adapted to continually alternately give, as output thereof and as input for recording stage, two kinds of calibration signals of different, higher and lower frequencies but of the same sound level as compared with each other; a variable resistor for adjusting intensity of the biasing current for the recording; a reproduced output sound level indicator; and a higher frequency range output level adjusting circuit adapted to adjust the reproduced output sound level, as indicated at the indicator, only of the higher frequency signal out of the two calibration signals; wherein the recording bias current adjusting variable resistor and the higher frequency range output level adjusting circuit are operatively connected with each other.

With this construction, it is made possible to obtain quite simply, easily and rapidly the optimal adjustment of the recording bias current, for the magnetic tape of any particular magnetic characteristics, in view that by recording the calibration signals for a short continuous period of time corresponding to only a few alternating shifting-overs of the lower and higher frequency signals and by then reproducing the recorded signals, corresponding shifting-overs in the reading of the level meter are obtained, and that if there is any noticeable difference between the meter indications of the two reproduced sound output levels, one for the lower and the other for the higher frequency signals, the indication unbalance can be compensated by manipulating the higher frequency range output level adjusting circuit to bring the reproduced higher frequency signal level indication at the meter reading to come to be same as the reproduced lower frequency signal level indication, which process, thus including only one recording and reproducing, together with the simple manipulation of the higher frequency range output level adjusting circuit while watching the level meter indications, automatically results in that the recording bias current adjusting variable resistor is actuated, in the operative interlocking with the said manipulation, to realize the optimal recording bias current intensity.

This invention is based on the proper evaluation of the facts empirically known but rather disregarded up to now, as are apparent from FIGS. 1, 2 and 3 and as may be itemized as follows:

(1) With respect to the lower frequency range, ratio of the reproduced sound output level variation to the recording bias current intensity variation is negligibly small.

(2) With respect to the higher frequency range, ratio of the reproduced sound output level variation to the recording bias current intensity variation, thus the gradient of the lines of the charts as in FIGS. 1 and 3, may be regarded as substantially constant over the range of the recording bias current variation as is practically required.

(3) The said gradient may furthermore be regarded also as remaining substantially same no matter of what kind the magnetic tape is.

and (4) The said gradient will vary to some extent depending upon the characteristic designing of the head used dually for recording and reproducing, but the actual value of the gradient can easily be experimentally determined when a head of a particular design is given and present.

Thus, when the recording bias current intensity is altered, then the reproduced lower frequency range sound level will show little variation in spite of such alteration, while the reproduced higher frequency range sound level will show variation substantially linearly with respect to such alteration, along a correlation line of the gradient known beforehand. It is made possible, therefore, to attain the said object of this invention, by providing the higher frequency range output level adjusting circuit to modify the reproduced output sound level as indicated at the indicator, only of the higher frequency signal out of the two calibration signals, and by suitably designing, upon knowledge of the said correlation gradient, the interlocking characteristics of the higher frequency range output level adjusting circuit and the recording bias current adjusting variable resistor in such manner that when the former is manipulated to bring the reproduced higher frequency signal level indication at the meter reading to come to be same as the reproduced lower frequency signal level indication, then the latter is actuated in the operative interlocking to automatically result in giving the optimal recording bias current intensity for the particular magnetic tape actually used.

Other objects and advantages of this invention will be apparent from the detailed description now to follow:

BRIEF DESCRIPTION OF THE DRAWINGS

FIG. 1 is a chart showing characteristic correlation between the recording bias current intensity and the reproduced sound output level, with the curves for 400 Hz and 10 kHz;

FIG. 2 is a frequency charatristic chart with respect to sound reproduction with a magnetic tape; showing how the curve is modified by altering the recording bias current intensity;

FIG. 3 is a chart similar to FIG. 1, showing how the curves differ as the different magnetic tapes are used;

DETAILED DESCRIPTION OF A PREFERRED EMBODIMENT

Figure 4:
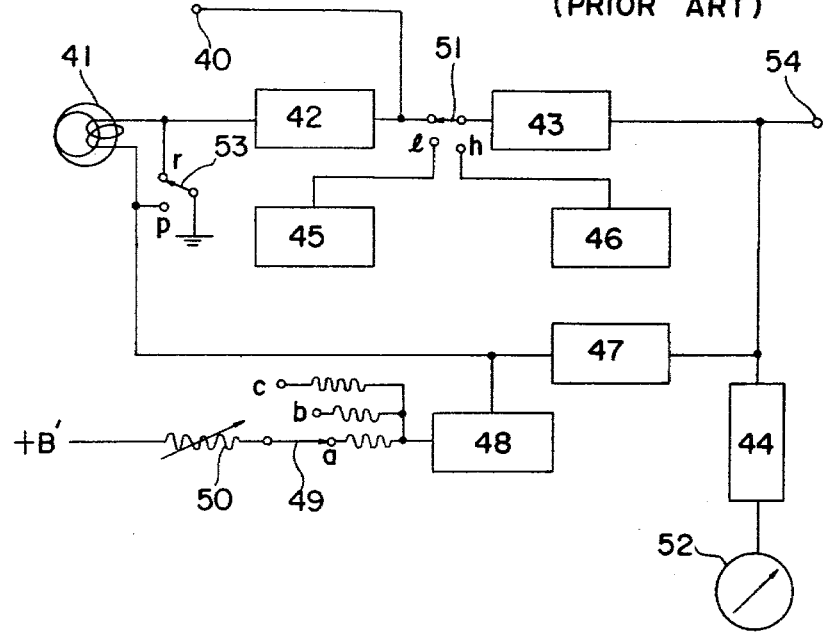
FIG. 4 is a block diagram of a conventional type of circuitry for adjustment of the recording bias current.
Figure 5:
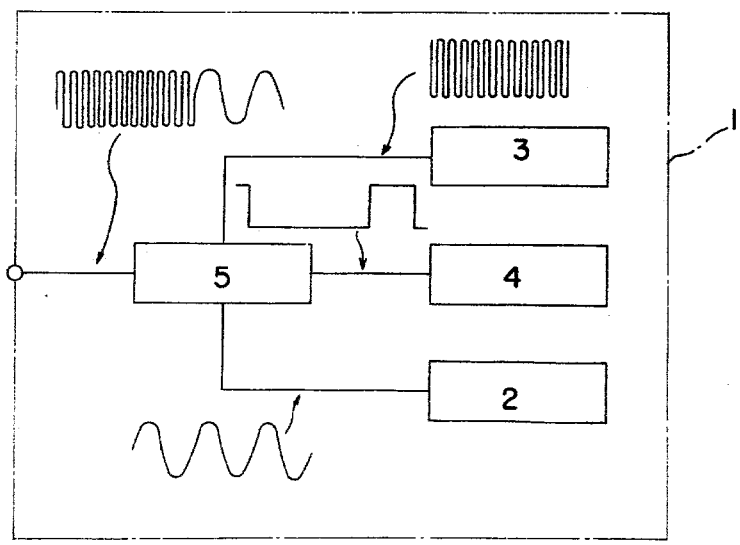
FIG. 5 is a block diagram of an embodiment of the calibration signal generator used in a circuitry for adjustment of the recording bias current according to this invention.

FIG. 5 shows a block diagram of a calibration signal generator 1 used in the circuitry for adjustment of the recording bias current according to this invention. This generator 1 comprises a lower frequency signal generator 2, a higher frequency signal generator 3, a square-wave signal generator 4 and a switching circuit 5. In the switching circuit 5, the lower frequency signal and the higher frequency signal are selectively switched over in accordance with the square-wave signal, thus to give, as the calibration signal output, two kinds of the said lower and higher frequency signals, appearing alternately at the frequency of the square-wave signal, at the same sound level as compared with each other.

The square-wave signal is of the unbalanced duty ratio deviating from the balancing ratio of $\frac{1}{2}$, so that it may always be easy to judge whether the lower or higher frequency signal is being on indication at the level meter 15 (FIG. 6, to be explained later in more detail), simply from distinguishing whether the signal switching-over interval duration is being shorter or longer.

In the instance illustrated and now described, it is supposed in view of the frequency range normally given as input for the recording, that the lower and higher frequency signals are of sinusoidal wave-forms of the frequencies of 400 Hz and 10 kHz, respectively, and that the duty ratio of the square-wave signal is selected, for the convenience of the practval adjusting operation of the recording bias current, to give the output switching-over interval durations of 1 second and 3 seconds for the said lower and higher frequency signals, respectively.

Figure 6:
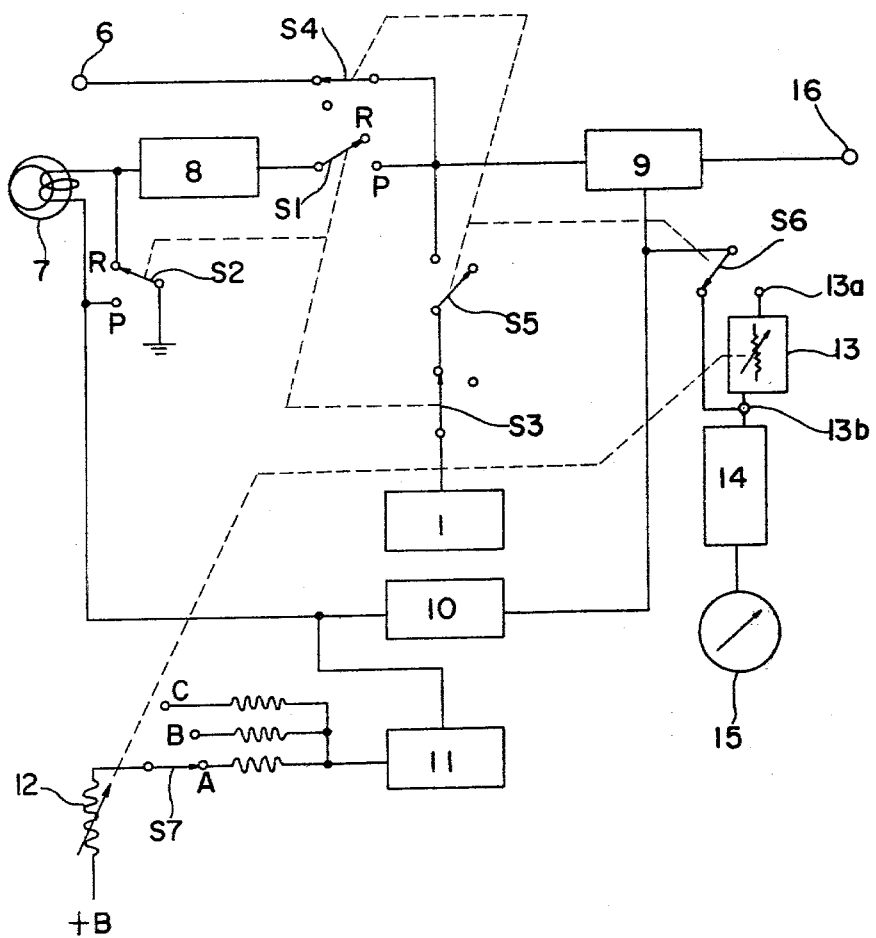
FIG. 6 is an overall block diagram of an embodiment of the circuitry for adjustment of the recording bias current according to this invention.

FIG. 6 shows a block diagram of an embodiment of the circuitry for adjustment of the recording bias current according to this invention. Designated at 1 is the calibration signal generator as already described in detail, 6 is the sound signal line input terminal, 7 is a head to be used dually for recording and reproducing the sound, 8 is a reproducing equalizer amplifier, 9 is a main line amplifier, 10 is a recording amplifier, 11 is a biasing oscilator, 12 is a variable resistor for adjusting intensity of the recording bias current, 13 is a higher frequency range output level adjusting circuit with input and output terminals thereof 13a and 13b, respectively, 14 is a meter amplifier, 15 is a meter to indicate the reproduced sound output level and 16 is the sound signal line output terminal. The symbol +B represents the power source voltage for the biasing oscilator 11.

Designated further at S1 and S2 are recording and reproducing mode selection switches (each with contacts R and P destined to recording and reproducing the sound, respectively) while S3 is a first switch for selection of calibration signal passing and cutting, and these three switches are all operatively connected to work as a gang switch set in such a manner that the switches S1 and S2 are shifted always to be set in the corresponding contact positions R or P and the switch S3 is shifted to pass the signal when the switches S1 and S2 are in their contact position R and to cut the signal when the switches S1 and S2 are in their contact position P.

Still more, designated at S4 is a switch for selection of recording-input-signal passing and cutting, S5 is a second switch for selection of calibration-signal passing and cutting, while S6 is a switch for selection of passing and cutting the higher frequency range output level adjusting circuit 13, and these three switches are again all operatively connected to work similarly as a gang switch set in such a manner that the switches S5 and S6 are shifted to be set in their cutting-off position when the switch S4 is in its passing-through position and to be set in their passing-through position when the switch S4 is in its cutting-off position. As is apparent to those skilled in the art, the said level meter 15 works as the recording-input sound level meter when in the normal recording mode, namely during recording of the sound signal from the terminal 6 rather than the calibration signal derived from the generator 1, thus with the switch S4 in its passing-through position and the switches S5 and S6 in their cutting-off position.

Still further, designated at S7 is a biasing current selection switch as is shifted over in accordance with the kind of the magnetic tape acutally used (with contacts A, B and C destined for instance to $CrO_2$, FeCr and $\gamma\text{-}Fe_2O_3$, respectively).

Figure 7:
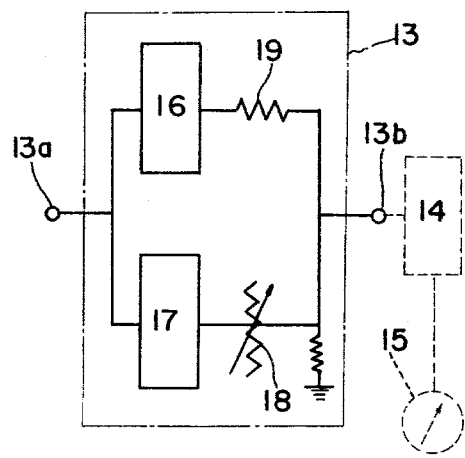
FIG. 7 is a block diagram of an embodiment of a higher frequency range output level adjusting circuit used in the circuitry for adjustment of the recording bias current according to this invention.
Figure 8:
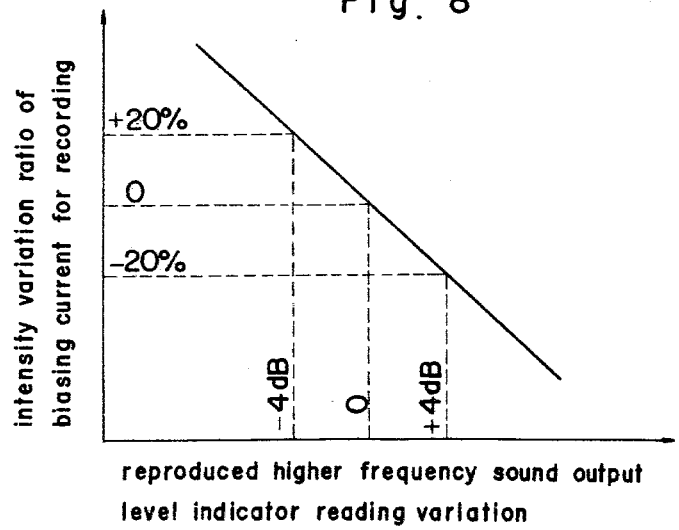
FIG. 8 is a chart showing the interlocking correlation between the reproduced higher frequency sound output level indicator reading variation and the intensity variation ratio of the biasing current for the recording, as is utilized in this invention.

FIG. 7 shows a breakdown block diagram of the said higher frequency range output level adjusting circuit 13 to selectively be inserted as an input stage to the meter amplifier 14. This circuit 13 essentially comprise a parallelly interconnected pair of a low pass filter 16 and a high pass filter 17, a fixed resistor 19 inserted in output line of the low pass filter 16, and a variable resistor 18 inserted in output line of the high pass filter 17. Thus, out of the signal given through the input terminal 13a, lower frequency range component will pass through the low pass filter 16, is then attenuated at a predetermined rate by means of the fixed resistor 19 and is given through the output terminal 13b as the output to the meter amplifier 14, while higher frequency range component will pass through the high pass filter 17, is then attenuated at any desired rate within a sufficiently wide range by means of the variable resistor 18 and is thereafter also given through the output terminal 13b as the output to the meter amplifier 14. It is therefore possible, by manipulating the variable resistor 18, to freely adjust the reproduced output sound level only of the higher frequency signal out of the entire input signal.

This variable resistor 18 of the higher frequency range output level adjusting circuit 13 is operatively connected to the already described another variable resistor 12 for adjusting the intensity of the recording bias current. More particularly, these two variable resistors 12 and 18 are interlocked in such a manner that variation in the reproduced sound level of the higher frequency range signal as indicated at the indicator 15 upon manipulation of the variable resistor 18 always substantially identically corresponds to variation in the reproduced higher frequency range sound level resulting from variation in the intensity of the biasing current for the recording as caused by the interlocked operation of the variable resistor 12.

Experimental results with the tape-recorder incorporating the circuitry as illustrated and described hereinabove have shown that the variation of ±20% in the recording bias current intensity causes the variation of approximately ∓4 dB in the reproduced higher frequency range sound output level, with correlation between these two variations over such ranges substantially linear with each other. In view thereof, the interlocking characteristics of the variable resistor 12 have properly been adapted to result in the variation of ∓20% in the recording bias current intensity in automatic response to adjusting manipulation of the variable resistor 18 to cause the variation ±4 dB in the reproduced sound level of the higher frequency range signal as indicated at the indicator 15, with correlation between these two variations over such ranges substantially linear with each other.

How the actual adjustment of the recording bias current is performed with the circuitry of this invention is now described hereunder:

First, the switch S7 is set in its suitable contact position in good accordance with the kind of the magnetic tape actually used. When the switch S5 is set here in its passing-through position, then in simultaneous interlocking therewith, the switch S4 is set in its cutting-off position and the switch S6 makes up connection to the input terminal 13a of the adjusting circuit 13. Subsequently, when the switch S1 is now shifted over to its contact R position, then in simultaneous interlocking therewith, the switch S2 is also shifted over to its contact R position and the switch S3 is set in its passing-through position, thus starting continually alternately supplying two kinds of the calibration signals of the lower and higher frequencies to the head 7 and recording same on to the running magnetic tape. After recording for a short while, the recorded tape is rewound. When the switch S1 is here shifted over to its contact P position, then the switch S2 is also automatically shifted over to its contact P position and the switch S3 is set in its cutting-off position, thus starting to reproduce the recorded signal sound, more particularly to cause indications of the indicator 15 representing alternate successions of the sound output levels of the lower frequency (400 Hz, for 1-second duration) and of the higher frequency (10 kHz, for 3-second duration). If the recording bias current intensity happened to be optimal, then the sound reproduction frequency characteristic chart has a sufficiently wide flat range, resulting in the identical reproduced sound output level with respect to the lower and higher frequency calibration signals, and thus the indication of the indicator 15 remains constant without fluctuation even under the shifting-overs of the two calibration signals.

However, if the recording bias current intensity was inadequate, then the sound reproduction frequency characteristic chart shows unbalance in the reproduced sound output levels with respect to the lower and higher frequency calibration signals, and thus the indication of the indicator 15 fluctuates up and down in two different levels. In the case of such fluctuation, the reading of the indicated sound level during reproduction of the lower frequency claibration signal (for 1-second duration) is memorized or registered, and then the variable resistor 18 of the higher frequency range output level adjusting circuit 13 is manipulated in the intention of bringing the indicated sound level during the later reproduction of the higher frequency calibration signal (for 3-second duration) into coincidence with the said level indication of the lower frequency signal.

Interlockingly with such manipulation of the variable resistor 18, the other variable resistor 12 is then automatically adjusted to have such proper resistance as to realize the optimal recording bias current as will thus make the sound output levels of the higher and lower frequency signals, recorded under such biasing condition, coincide with each other.

It has thus been made possible in accordance with this invention to actually set the optimal recording bias current intensity to realize the reproduced sound frequency characteristic chart with the widest flat range, simply by recording and reproducing for a short while the calibration signals derived from the generator 1 and by then manipulating the variable resistor 18 of the higher frequency range output level adjusting circuit 13, after recording the first spell of the reproduced lower frequency claibration signal sound output level indication, to bring the indication of the subsequent reproduced higher frequency signal output level into coincidence with the said reading with respect to the lower frequency signal.

Since the higher frequency range output level adjusting circuit 13 is adapted to adjust the reproduced output sound level only of the higher frequency signal and since variation in the lower frequency range output level caused by variation in the recording bias current intensity as is actuated by the automatic adjustment of the variable resistor 12 in interlocking with adjustment of the said circuit 13 is practially negligibly small in comparison with the variation in the higher frequency range output level simultaneously caused by the said recording bias variation, it is possible to very easily and very exactly bring the reproduced sound output level indication reading of the higher frequency calibration signal into coincidence with that of the lower frequency signal.

I claim:
1. Recording bias current adjusting circuitry adapted for use in a two-head type tape recorder having an eraser head and a recording/reproduction head (7) comprising;
 a calibration signal generator (1) adapted to alternately and continuously give to a recording input stage two kinds of calibration signals of higher and lower frequencies but of the same input level,
 a variable resistor (12) for adjusting intensity of a recording bias current,
 an indicator (15) for indicating output levels of reproduced signals,
 an output level adjusting circuit (13) adapted to adjust only higher-frequency reproduction output levels out of various-frequency reproduction output levels indicated at the indicator (15), and
 said variable resistor (12) being operatively connected to the output level adjusting circuit (13) for adjusting the output level adjusting circuit (13) and adapted to be settable to a resistance value to provide an optimal intensity of the recording bias current to realize a flat frequency characteristic when the output level adjusting circuit (13) is adjusted to cause the reproduced output level of the higher-frequency calibration signal to coincide with the reproduced output level of the lower-frequency calibration signal shown at the indicator (15).

2. Circuitry as defined in claim 1, wherein said calibration signal generator (1) comprises a lower-frequency calibration signal generator (2), a higher-frequency calibration signal generator (3), a square-wave signal generator (4), said three signal generator (2,3,4) being arranged parallel to one another, and a switching circuit (5) commonly inserted in output lines of the three signal generators (2, 3, 4).

3. Circuitry as defined in claim 2, wherein said higher-frequency range output level adjusting circuit (13) comprises a low pass filter (16) and high pass filter (17) in parallel connection, a fixed resistor (19) inserted in an output line of the low pass filter (16), and a further variable resistor (18) inserted in an output line of the high pass filter (17).

4. Circuitry as defined in claim 3, wherein said two variable resistors (12, 18) are operatively connected such that variation in reproduced output level of a higher-frequency range signal indicated at the indicator (15) upon manipulation of the further variable resistor (18) substantially corresponds to variation in reproduced output level of the higher-frequency range signal resulting from variation in the recording bias current caused by the interlocked operation of the variable resistor (12).

5. Circuitry as defined in claim 4, wherein said lower and higher-frequency calibration signal generators (2,3) are adapted to give sinusoidal calibration signals substantially of the frequencies of 400 Hz and 10 kHz, respectively.

6. Circuitry as defined in claim 5, wherein said square-wave signal generator (4) and the switching circuit (5) are adapted to give the higher-frequency calibration signal for a longer duration than the lower frequency calibration signal.

7. Circuitry as defined in claim 6, wherein said square-wave signal generator (4) and the switching circuit (5) are adapted to give the lower-frequency calibration signal substantially for one second and the higher-frequency calibration signal substantially for three seconds.

* * * * *